July 5, 1955 F. K. KNOHL 2,712,262
RETAINER HAVING CENTERING AND ANTI-TILTING MEANS
Filed June 28, 1951
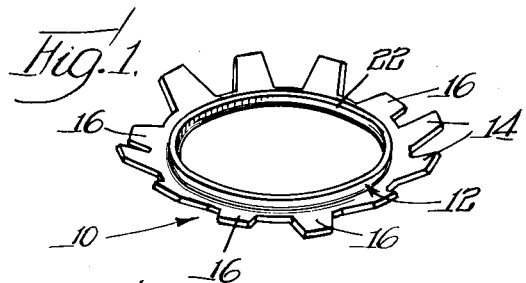
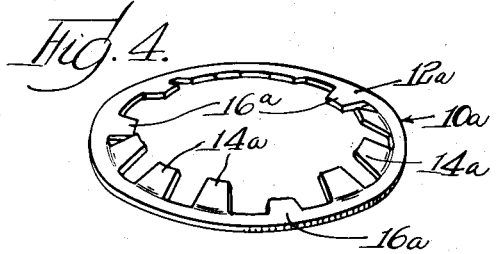
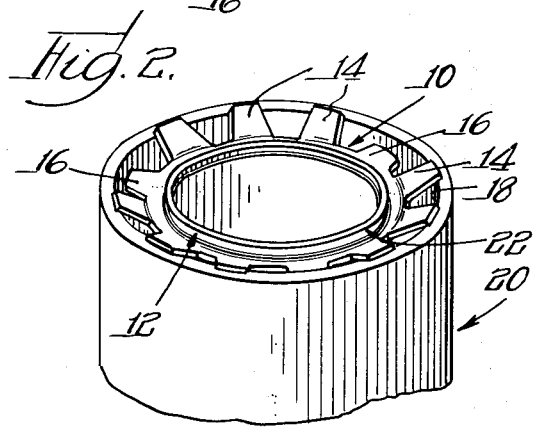
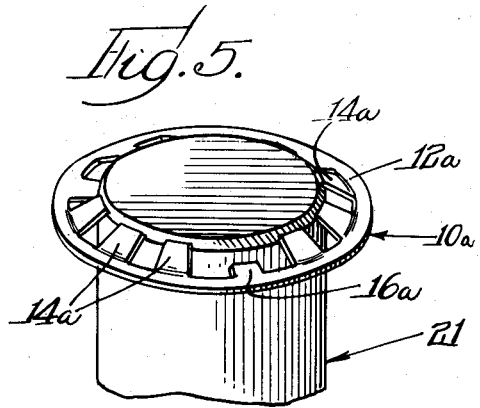
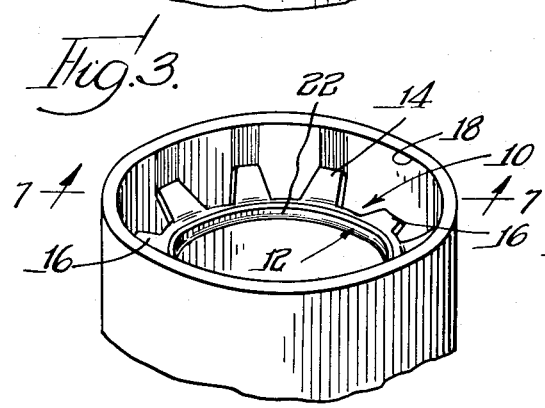
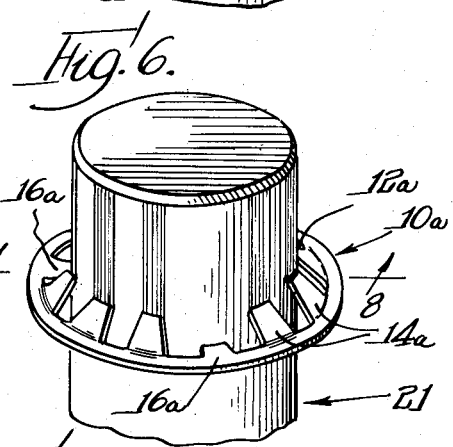
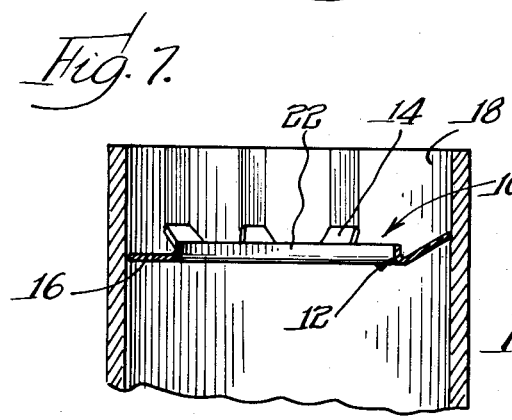
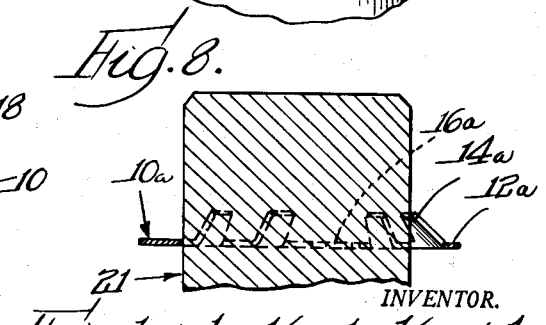
INVENTOR.
Friedrich Karl Knohl
BY
Moore, Olson & Trexler
Attys

United States Patent Office 2,712,262
Patented July 5, 1955

2,712,262

RETAINER HAVING CENTERING AND ANTI-TILTING MEANS

Friedrich Karl Knohl, Chicago, Ill., assignor to Illinois Tool Works, Chicago, Ill., a corporation of Illinois Application June 28, 1951, Serial No. 234,033

3 Claims. (Cl. 85—36)

This invention relates generally to a fastener device, and more particularly to a sheet metal retainer washer or annulus adapted to be telescopically associated with an outer or an inner peripheral surface of a work piece.

Annular fasteners having peripheral internal locking teeth or prongs adapted to be pushed into telescopic association with a cylindrical surface of a work part, as for example the periphery of the post of a loose leaf binder, have heretofore been in common use. Similarly, fasteners with peripheral external teeth have been used for securing parts within the counterbore of a work piece. One of the problems incident to the telescopic association of fasteners of the above mentioned type with either an external periphery or an internal periphery is that of preventing the washer from canting. In other words, in order for the prongs or teeth of the retainer washer to maintain uniform locking engagement with the complementary work surface, it is essential that the washer be properly centered during telescopic association. The present invention is directed primarily to a retainer device of the type referred to above, having means in association therewith which will assure centering of the washer, both prior to and during assembly thereof with a work part.

More specifically, it is an object of the present invention to provide a retainer washer or annulus which not only has prongs for lockingly engaging the periphery of the work part, but also other elements, as for example additional prongs which cooperate with said work surface to properly center the washer as it is initially telescopically associated with the work.

Another object of the present invention is to provide a retainer ring or washer in which the annular prong supporting body of the washer may be of limited radial extent and thereby effect a saving in material cost.

Still another object of the present invention is to provide a new and improved retainer ring or washer as set forth above, wherein the construction of the washer body is such as to not only reduce cost of material but also to resist stock deformation during heat treament of the washer.

The present invention also contemplates retainer washers having circumferentially disposed groups providing novel work engaging or biting edges at their extremities to assure positive engagement of the washer member with respect to a complementary work piece when mounted thereon.

These and other objects of the invention will be more clearly understood by a study of the accompanying drawings and description, wherein—

Fig. 1 is a perspective view showing a retainer washer provided with external work engaging prongs or teeth with a second series of radially extending washer centering prongs or teeth, and further showing the washer with a flanged internal periphery;

Fig. 2 is a perspective view of the retainer washer shown in Fig. 1 showing externally extending prongs or teeth accomplishing centering of the washer relative to a work piece;

Fig. 3 is a perspective view showing the retainer washer mounted in the counterbore of a work piece;

Fig. 4 is a perspective view of another embodiment of the retainer washer provided with internal work engaging prongs with a second series of radially extending washer centering prongs;

Fig. 5 is a perspective view of the retainer washer in Fig. 4 showing internally extending teeth accomplishing centering of the washer relative to a stud member;

Fig. 6 is a perspective view of the retainer washer having internally extending teeth mounted on a stud member;

Fig. 7 is a fragmentary vertical sectional view taken substantially along the line 7—7 of Fig. 3; and Fig. 8 is a fragmentary vertical sectional view taken substantially along the line 8—8 of Fig. 6.

Referring now to the drawings wherein like numerals have been employed to designate similar parts throughout the various figures, it will be seen that one embodiment of the present invention is illustrated by a retainer washer designated generally by the numeral 10 in Figs. 1 to 3, inclusive. This retainer washer comprises an annular body 12 and a plurality of external radially extending axially deflected and circumferentially spaced prongs 14. These prongs 14 are best described as work engaging prongs which present outer edges adapted to bitingly engage the internal periphery of a hollow work part. Also disposed about the periphery of the annular body 12 are a plurality of radially extending prongs 16 whose radial extent is less than that of the prongs or teeth 14. These prongs 16, as shown in Fig. 1, provide work engaging edges or ends which lie either in the plane of the annular body or in a plane spaced axially from the plane defining the outer edges of prongs 14. Furthermore as shown in Figs. 7 and 8, the surfaces of the prongs 16 defining the ends thereof are substantially parallel to the washer axis so that the corners of these ends will not dig into the work piece during application of the washer and so that these flat end surfaces restrain the washer against tilting relative to the work. Thus, upon telescopic association of the retainer member 10 with the counterbore 18 of a work piece 20, the prongs 16 serve to center the washer relative to said counterbore. This insures concentric positioning of the washer with respect to the counterbore 18 and consequent uniform engagement of the extremities of the prongs 14 upon further insertion of the washer within the counterbore.

It should be noted that the washer member 10 is provided on the inner margin of its annular body with an axially extending flange 22 which serves to reinforce the annular body against flexing or distortion. By providing the washer with such a flange member, it is possible to reduce the amount of stock required to give a retainer washer of this type sufficient strength to avoid distortion during the telescopic association thereof with a work part. Further, since many of these devices are made from steel which is subsequently heat treated, it is desirable that it be so designed as to prevent distortion of the annular body of the washer member during the heat treating operation.

Fig. 4 shows another embodiment of the washer heretofore described, this embodiment being directed to an internally toothed washer member adapted for use on posts or studs. As previously indicated the teeth 16a are of less radial extent than the teeth 14a, and are positioned so as to engage the post member 21 before engagement by teeth 14a and positively center washer member 10a relative thereto. It should be noted with particularity that in the embodiment shown in Fig. 4 no axially extending flange has been provided to strengthen the annular body 12a. In such an event, the radial extent or width of the annular body will necessarily have to be sufficient to provide the required rigidity to withstand tendency to become distorted during the heat treatment operation and to prevent distortion thereof as the member is being applied to the work part.

Attention is also directed to the fact that the embodiments shown in Figs. 1 to 4 contemplate teeth 14 and 14a respectively of a new and novel design. These teeth are predeflected relative to the annular body from which they extend so as to present one edge of the free end portion of each of the teeth 14 and 14a for positive engagement of the work part. In Fig. 1 the free end portion or extremity is a straight line parallel to a line tangent to a circle which is concentric with the washer axis and presenting corners which embed themselves into the cylindrical wall of the work part in their mounted position, as shown in Fig. 3. Obviously, these corners embed themselves with sufficient depth so that the entire lower edge on the free end portion of the teeth lockingly engages the wall of the counterbore.

In Fig. 4 the free ends of the prongs are arcuate and are coincident with a circle concentric with the washer axis. However, it is contemplated that the radius of this arc may in some instances be less than the radius of the circle defined by the free extremities of the prongs so that the aggressive embedding action may be obtained.

From the foregoing it will be apparent that the present invention contemplates a novel and practical retainer washer device capable of being produced very economically by conventional manufacturing methods. It will also be clear that this invention solves the problem of centering the retainer member relative to the work with which it is telescopically associated, and by the provision of novel work engaging teeth insures more positive locking engagement of said washer member in mounted position. In addition, in instances where the washer member is to be heat treated and the material of the washer is relatively thin or where material savings are desired by limiting the radial extent or width of the annular body of the washer, the provision of a flange on the periphery of said washer will give the necessary strengthening effect to counteract warpage of the washer during heat treating or deformation of the washer when same is applied to a work part.

While for the purposes of illustration certain structural features have been disclosed, it will be apparent that the invention is capable of other modifications and changes without departing from the spirit and scope of the invention.

The invention is hereby claimed as follows:

1. A sheet metal retainer washer comprising a narrow substantially flat circular body having a central aperture therein, a set of three prongs substantially coplanar with said body and spaced equally about the periphery of and extending radially from a margin of said body, the end faces of said prongs being disposed substantially parallel to the washer axis ensuring centering of the washer body relative to the complementary work surface with which the retainer washer is adapted to be associated, a second set of prongs of the same general configuration as said first set and consisting of a plurality of circumferentially spaced axially deflected flexible prongs extending from the same margin of the body as and between each of the coplanar prongs, said second set of prongs having greater radial extent than said first set of prongs and provided with end faces at their extremities disposed at an acute angle to the washer axis to present work-engaging edges for aggressively engaging the wall surface of the aforementioned complementary workpiece, said prongs having circumferential extent adjacent the margin at least equal to the circumferential extent at their end faces, and a continuous flange extending from the margin of said body opposite the margin supporting the prongs in an axial direction for strengthening the body without increasing the radial thickness thereof.

2. A sheet metal retainer washer of the type described in claim 1, wherein the first and second sets of prongs extend radially inwardly from the margin of said body.

3. A sheet metal retainer washer of the type set forth in claim 1, wherein the first and second sets of teeth extend radially outwardly from the margin of said body.

References Cited in the file of this patent

UNITED STATES PATENTS

| 312,943 | Winans | Feb. 24, 1885 |
| 1,750,965 | Osterman | Mar. 18, 1930 |
| 2,064,092 | Tinnerman | Dec. 15, 1936 |
| 2,133,871 | Reed | Oct. 18, 1938 |
| 2,321,158 | Rees | June 8, 1943 |
| 2,492,115 | Crowther | Dec. 20, 1949 |
| 2,577,319 | Feitl | Dec. 4, 1951 |
| 2,618,009 | Tinnerman | Nov. 18, 1952 |

FOREIGN PATENTS

| 627,059 | Great Britain | July 27, 1949 |